(12) United States Patent
Hua et al.

(10) Patent No.: US 12,155,574 B2
(45) Date of Patent: Nov. 26, 2024

(54) METHOD AND APPARATUS FOR ACCESSING GATEWAY

(71) Applicant: Huawei Technologies Co., Ltd., Guangdong (CN)

(72) Inventors: Rongrong Hua, Nanjing (CN); Zhouyi Yu, Beijing (CN); Jing Liu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 387 days.

(21) Appl. No.: 17/451,889

(22) Filed: Oct. 22, 2021

(65) Prior Publication Data

US 2022/0078122 A1 Mar. 10, 2022

Related U.S. Application Data

(63) Continuation of application No. PCT/CN2020/086770, filed on Apr. 24, 2020.

(30) Foreign Application Priority Data

Apr. 24, 2019 (CN) .......................... 201910332103.0
Apr. 23, 2020 (EP) ...................................... 20171020

(51) Int. Cl.
*H04L 12/46* (2006.01)
*H04B 10/25* (2013.01)
*H04L 9/40* (2022.01)
*H04L 47/2425* (2022.01)
*H04L 45/64* (2022.01)

(52) U.S. Cl.
CPC ......... *H04L 47/2425* (2013.01); *H04B 10/25* (2013.01); *H04L 12/4641* (2013.01); *H04L 63/0892* (2013.01); *H04L 45/64* (2013.01)

(58) Field of Classification Search
CPC ............. H04L 47/2425; H04L 12/4641; H04L 63/0892; H04L 45/64; H04L 12/287;
(Continued)

(56) References Cited

U.S. PATENT DOCUMENTS

| | | | | |
|---|---|---|---|---|
| 9,509,598 B2 * | 11/2016 | Hassan | ................. | H04L 12/437 |
| 2007/0178885 A1 * | 8/2007 | Lev | ........................ | H04W 12/06 |
| | | | | 713/168 |

(Continued)

FOREIGN PATENT DOCUMENTS

| | | |
|---|---|---|
| CN | 101971666 A | 2/2011 |
| CN | 102684898 A | 9/2012 |

(Continued)

OTHER PUBLICATIONS

Guangping Huang Fangwei Hu Zte Corporation Shujun Hu Fengwei Qin China Mobile: "Yang Data Model for Configuration Interface of Control-Plane and User-Plane separation BNG; draft-cuspdt-rtgwg-cu-separation-yang-model-03. txt", Internet-Draft: IETF RTGWG, Internet Engineering Task F, No. 3 Mar. 11, 2019 (Mar. 11, 2019), pp. 1-28, XP015131737.

*Primary Examiner* — Lan-Huong Truong
(74) *Attorney, Agent, or Firm* — WOMBLE BOND DICKINSON (US) LLP

(57) ABSTRACT

This application discloses a method and an apparatus for accessing a gateway, and pertains to the field of communications technologies. A service level agreement (SLA) level may be obtained based on user information of a terminal, and further a user plane (UP) device corresponding to the terminal is determined based on the SLA level of the terminal. Thus, terminals with different SLA levels may be allocated to different UP devices for bearing, so that a specific terminal may access a specified UP device. This resolves a problem in a related technology that a terminal relatively randomly accesses a UP device. In addition, because an SLA level may be used to indicate a level of quality of service of a terminal, after terminals with different SLA levels access different UP devices, differentiated ser- (Continued)

vices may be provided on the different UP devices. Therefore, user requirements are met, and revenues are increased.

32 Claims, 5 Drawing Sheets

(58) Field of Classification Search
CPC . H04L 41/40; H04L 12/2859; H04L 41/5019; H04L 41/5003; H04L 12/1403; H04L 12/4633; H04L 63/0876; H04B 10/25
See application file for complete search history.

(56) References Cited

U.S. PATENT DOCUMENTS

| | | | |
|---|---|---|---|
| 2014/0112657 A1* | 4/2014 | Diab | H04L 41/5067 398/25 |
| 2015/0049643 A1 | 2/2015 | Sheth et al. | |
| 2018/0101398 A1 | 4/2018 | Barabash et al. | |
| 2019/0036779 A1* | 1/2019 | Bajaj | H04L 41/0816 |
| 2022/0053364 A1* | 2/2022 | Kim | H04W 28/0268 |
| 2022/0263556 A1* | 8/2022 | Sergeev | H04B 7/0469 |

FOREIGN PATENT DOCUMENTS

| | | |
|---|---|---|
| CN | 103944752 A | 7/2014 |
| CN | 105828315 A | 8/2016 |
| CN | 106559451 A | 4/2017 |
| CN | 108206772 A | 6/2018 |
| CN | 108271433 A | 7/2018 |
| CN | 108462596 A | 8/2018 |
| CN | 108885606 A | 11/2018 |
| CN | 108924849 A | 11/2018 |
| CN | 109150767 A | 1/2019 |
| EP | 3404878 A1 | 11/2018 |
| WO | 2018177434 A1 | 10/2018 |

* cited by examiner

METHOD AND APPARATUS FOR ACCESSING GATEWAY

CROSS-REFERENCE TO RELATED APPLICATIONS

This application is a continuation of International Application No. PCT/CN2020/086770, filed on Apr. 24, 2020, and claims priority to European Patent Application No. 20171020.9, filed Apr. 23, 2020, both of which claim priority to Chinese Patent Application No. 201910332103.0, filed on Apr. 24, 2019. The disclosures of the aforementioned applications are hereby incorporated by reference in their entireties.

TECHNICAL FIELD

This application relates to the field of communications technologies, and in particular, to a method and apparatus for accessing a gateway.

BACKGROUND

As a software-defined networking (SDN) technology and a network functions virtualization (NFV) technology develop, a broadband network gateway (BNG) decouples a control function from a forwarding function based on an architecture of the SDN technology and the NFV technology. The BNG that decouples the control function from the forwarding function based on the architecture of the SDN technology and the NFV technology may be referred to as a virtual broadband network gateway (vBNG). Usually, the vBNG may include a control plane (CP) device and a plurality of user plane (UP) devices, and the CP device may manage the plurality of UP devices.

In a related technology, when a terminal accesses the vBNG, the CP device may determine one UP device from the plurality of UP devices based on a quantity of user sessions currently established between each of the plurality of UP devices and another terminal or load of each UP device, and allocate the UP device to the terminal. Then, the terminal may access the UP device allocated to the terminal.

However, because the CP device allocates a UP device to the terminal based on a current quantity of user sessions or current load of each UP device, the terminal relatively randomly accesses a UP device, and the terminal cannot access a specified UP device. Consequently, a service cannot be specially provided for the terminal by using the specified UP device.

SUMMARY

This application provides a method and an apparatus for accessing a gateway, to resolve a problem in a related technology that a terminal relatively randomly accesses a UP device. The technical solutions are as follows.

According to a first aspect, a method for accessing a gateway is provided. The method includes: obtaining access line information and user information of a terminal; obtaining a service level agreement SLA level of the terminal based on the user information, where the SLA level is used to indicate a level of quality of service of the terminal; determining a target user plane UP device based on the SLA level; and controlling, based on the access line information, the terminal to access the target UP device.

In this embodiment of this application, the SLA level of the terminal may be obtained based on the user information of the terminal, and further a UP device corresponding to the terminal is determined based on the SLA level of the terminal. In this way, terminals with different SLA levels may be allocated to different UP devices for bearing, so that a specific terminal may access a specified UP device. This resolves a problem in a related technology that a terminal relatively randomly accesses a UP device. In addition, because an SLA level may be used to indicate a level of quality of service of a terminal, after the terminal accesses a corresponding UP device based on the SLA level of the terminal, a differentiated service may be provided for the terminal by using the UP device. Therefore, user requirements are met, and revenues are increased.

In an embodiment of the disclosure, an implementation process of obtaining the service level agreement SLA level of the terminal based on the user information may be: sending the user information to an authentication, authorization, and accounting AAA server, to instruct the AAA server to obtain the SLA level of the terminal; and receiving the SLA level that is of the terminal and that is sent by the AAA server.

In this embodiment of this application, a CP device may send the user information of the terminal to the AAA server, so that the AAA server may perform authentication and authorization on the terminal based on the user information. After the authentication performed by the AAA server on the terminal succeeds, the AAA server may obtain the SLA level of the terminal based on the user information of the terminal, and further return the SLA level to the CP device.

In an embodiment of the disclosure, the implementation process of obtaining the service level agreement SLA level of the terminal based on the user information may alternatively be: obtaining the SLA level of the terminal from a stored correspondence between user information and an SLA level based on the user information. In other words, the CP device may store the correspondence between user information and an SLA level. In this case, the CP device may directly obtain the SLA level of the terminal based on the user information.

In an embodiment of the disclosure, an implementation process of determining the target user plane UP device based on the SLA level may be: obtaining, from a stored correspondence between the SLA level and a device identifier, a device identifier corresponding to the SLA level of the terminal; and determining a device identified by the obtained device identifier as the target UP device.

Different SLA levels may correspond to different UP devices. In this way, terminals with different SLA levels correspond to different UP devices, and terminals with a same SLA level may correspond to a same UP device. In this way, different UP devices are used to provide differentiated services for terminals with different SLA levels.

In an embodiment of the disclosure, a process of controlling, based on the access line information, the terminal to access the target UP device may be: sending the access line information and device information of the target UP device to a software-defined networking SDN controller, to instruct the SDN controller to control the terminal to access the target UP device.

In an embodiment of the disclosure, the device information of the target UP device includes the device identifier of the target UP device, port information of a target port of the target UP device allocated to the terminal, and virtual local area network VLAN information corresponding to the target port.

In an embodiment of the disclosure, the device information of the target UP device includes the device identifier of the target UP device and a network identifier of a virtual extensible local area network VXLAN corresponding to the target UP device.

When a layer-3 network is applied between a UP device and an access network device, a VXLAN tunnel may be established between the UP device and the access network device. In this case, to map the terminal to the target UP device, the device information of the target UP device may include the network identifier of the VXLAN.

In an embodiment of the disclosure, after the determining a target user plane UP device based on the SLA level, the method further includes: generating user entry information; and sending the user entry information to the target UP device, to instruct the target UP device to forward, based on the user entry information, a data packet that is sent by the terminal after access succeeds.

After determining the target UP device, the CP device may deliver the user entry information of the terminal to the target UP device, so that the target UP device may forward, based on the user entry information, the data packet subsequently sent by the terminal.

In an embodiment of the disclosure, the user entry information includes an internet protocol IP address allocated to the terminal, a MAC address of the terminal, routing information of the terminal, and authorization information of the terminal.

In an embodiment of the disclosure, an implementation process of obtaining the access line information and the user information of the terminal may be: receiving a dialup protocol packet sent by the terminal by using the access network device, where the dialup protocol packet carries the access line information; and receiving a link control protocol LCP negotiation request sent by the terminal by using the access network device, where the LCP negotiation request carries the user information.

When the terminal dials up, the access line information may be carried in the dialup protocol packet and sent to the CP device. Then, in a process of session negotiation between the terminal and the CP device, the user information of the terminal may be carried in the LCP negotiation request and sent to the CP device.

In an embodiment of the disclosure, the access network device includes an optical line terminal OLT. Correspondingly, the access line information includes the media access control MAC address of the terminal, a device identifier of the OLT, port information of a port that is on the OLT and that is connected to the terminal, and an identifier of an optical network unit ONU to which the OLT belongs.

According to a second aspect, a method for accessing a gateway is provided. The method includes: receiving access line information of a terminal and device information of a target UP device that are sent by a control plane CP device, where the target UP device corresponds to an SLA level of the terminal; and controlling, based on the access line information and the device information of the target UP device, the terminal to access the target UP device.

In this embodiment of this application, after receiving the access line information of the terminal and the device information of the target UP device that are sent by the CP device, an SDN controller may control, based on the access line information and the device information of the target UP device, the terminal to access the target UP device. The target UP device corresponds to the SLA level of the terminal. In other words, the terminal may access a specified UP device in this application. Therefore, this resolves a problem in a related technology that a terminal relatively randomly accesses a UP device.

In an embodiment of the disclosure, the access line information includes a device identifier of an OLT included in an access network device connected to the terminal, port information of a port that is on the OLT and that is connected to the terminal, and an identifier of an optical network unit ONU to which the OLT belongs. When a layer-2 network is applied between the access network device and the target UP device, the device information of the target UP device includes virtual local area network VLAN information corresponding to a target port on the target UP device, and the target port is a port allocated to the terminal. The device information of the target UP device may further include a device identifier of the target UP device and port information of the target port, so that the SDN controller may store and maintain the information.

Correspondingly, an implementation process of controlling, based on the access line information and the device information of the target UP device, the terminal to access the target UP device may be: determining, based on the access line information, VLAN information corresponding to the terminal; and sending a migration instruction to the OLT based on the device identifier of the OLT, where the migration instruction carries the port information of the port that is on the OLT and that is connected to the terminal, the VLAN information corresponding to the terminal, and the VLAN information corresponding to the target port, and the migration instruction is used to instruct the OLT to access, based on the port information of the port that is on the OLT and that is connected to the terminal, the VLAN information corresponding to the terminal, and the VLAN information corresponding to the target port, the terminal to the target UP device.

The VLAN information corresponding to the terminal is an identifier of a VLAN connected to the terminal when the terminal dials up, namely, information about a VLAN corresponding to a default UP device. In this embodiment of this application, the VLAN information corresponding to the terminal and the VLAN information corresponding to the target port of the target UP device are sent to the OLT. Therefore, the OLT may remap, based on the received information, the VLAN corresponding to the terminal when the terminal dials up to a VLAN corresponding to the target port of the target UP device. In this way, even if a MAC address of the target UP device is the same as a MAC address of the default UP device when the terminal dials up, it can also be ensured that the terminal subsequently accesses the target UP device instead of the default UP device.

In an embodiment of the disclosure, the access line information includes a device identifier of the OLT included in an access network device connected to the terminal, port information of a port that is on the OLT and that is connected to the terminal, and an identifier of an optical network unit ONU to which the OLT belongs. When a layer-3 network applied is between the access network device and the target UP device, a VXLAN tunnel may be established between the access network device and the target UP device. The device information of the target UP device includes a device identifier of the target UP device and a network identifier of a virtual extensible local area network VXLAN corresponding to the target UP device. In this case, an implementation process of controlling, based on the access line information and the device information of the target UP device, the terminal to access the target UP device may be: determining, based on the access line information, VLAN information corresponding to the terminal; and sending a migration instruction to the OLT based on the device identifier of the OLT, where the migration instruction carries the port information of the port that is on the OLT and that is connected to the terminal, the VLAN information corresponding to the terminal, and the network identifier of the VXLAN corresponding to the target UP device, and the migration instruction is used to instruct the OLT to access, based on the port information of the port that is on the OLT and that is connected to the terminal, the VLAN information corresponding to the terminal, and the network identifier of the VXLAN corresponding to the target UP device, the terminal to the target UP device.

According to a third aspect, an apparatus for accessing a gateway is provided, and the apparatus for accessing a gateway has a function of implementing behavior of the method for accessing a gateway according to the first aspect or the second aspect. The apparatus for accessing a gateway includes at least one module, and the at least one module is configured to implement the method for accessing a gateway provided in the first aspect or the second aspect.

According to a fourth aspect, an apparatus for accessing a gateway is provided. A structure of the apparatus for accessing a gateway includes a processor and a memory. The memory is configured to store a program for supporting the apparatus for accessing a gateway to perform the method for accessing a gateway provided in the first aspect or the second aspect, and store data used to implement the method for accessing a gateway provided in the first aspect or the second aspect. The processor is configured to execute the program stored in the memory. The apparatus for accessing a gateway may further include a communications bus, and the communications bus is configured to establish a connection between the processor and the memory.

According to a fifth aspect, a computer readable storage medium is provided. The computer readable storage medium stores an instruction; and when the instruction is run on a computer, the computer is enabled to perform the method for accessing a gateway according to the first aspect or the second aspect.

According to a sixth aspect, a computer program product including an instruction is provided. When the instruction is run on a computer, the computer is enabled to perform the method for accessing a gateway according to the first aspect or the second aspect.

Technical effects achieved in the second aspect, the third aspect, the fourth aspect, the fifth aspect, and the sixth aspect are similar to technical effects achieved by using corresponding technical means in the first aspect. Details are not described herein again.

Beneficial effects brought by the technical solutions provided in this application may include at least the following.

In the embodiments of this application, an SLA level may be obtained based on user information of a terminal, and further a UP device corresponding to the terminal is determined based on the SLA level of the terminal. In this way, terminals with different SLA levels may be allocated to different UP devices for bearing, so that a specific terminal may access a specified UP device. This resolves a problem in a related technology that a terminal relatively randomly accesses a UP device. In addition, because an SLA level may be used to indicate a level of quality of service of a terminal, after terminals with different SLA levels access different UP devices, differentiated services may be provided on the different UP devices. Therefore, user requirements are met, and revenues are increased.

DESCRIPTION OF EMBODIMENTS

To make objectives, technical solutions, and advantages of this application clearer, the following further describes implementations of this application in detail with reference to the accompanying drawings.

Before the embodiments of this application are described in detail, a system architecture in the embodiments of this application is described first.

Figure 1:
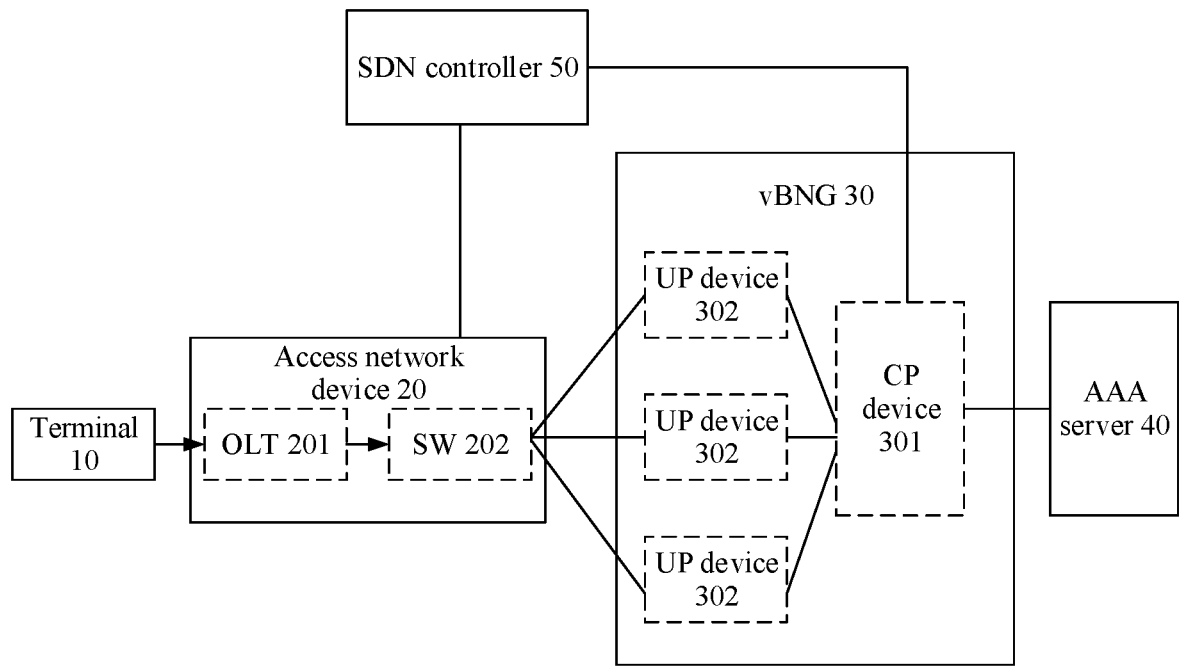
FIG. 1 is a diagram of an implementation environment of a method for accessing a gateway according to an embodiment of this application.

FIG. 1 is an architectural diagram of a system related to a method for accessing a gateway according to an embodiment of this application. As shown in FIG. 1, the system includes a terminal 10, an access network device 20, a vBNG 30, an authentication, authorization, and accounting (AAA) server 40, and an SDN controller 50.

The terminal 10 may be user equipment that is directly connected to the access network device 20, such as a smartphone, a desktop computer, a portable computer, or a tablet computer.

Alternatively, the terminal 10 may be a residential gateway (RGW). When the terminal 10 is an RGW, the RGW may be connected to a plurality of user equipments such as a smartphone, a desktop computer, and a portable computer, and the plurality of user equipments are connected to the RGW. In this case, the RGW may perform network address translation (NAT) processing on the connected user equipments. In addition, the RGW may communicate with the access network device 20, and perform point-to-point protocol over Ethernet (PPPoE) dialup and internet protocol over Ethernet (IPoE) dialup by using the access network device 20, to obtain an IP address from the vBNG 30, so as to access the vBNG 30 based on the obtained IP address. In this way, after the RGW is connected to the vBNG 30, the user equipments connected to the RGW may access the vBNG by using the RGW, to perform network access.

The access network device 20 may include an optical line terminal (OLT) 201 and/or a switch (SW) 202. When the access network device includes the OLT 201 and the SW 202, the OLT 201 may separately communicate with the terminal 10 and the SW 202. For example, the OLT 201 may receive a dialup protocol packet and a data packet that are sent by the terminal 10, and forward the received packet to the SW 202. In addition, the OLT 201 may further receive information returned by the SW 202, and forward the received information to the terminal 10.

The vBNG 30 includes a CP device 301 and a plurality of UP devices 302. The CP device 301 establishes communication connections to each of the access network device 20, the AAA server 40, and the SDN controller 50. In addition, the CP device 301 may control, by using the method for accessing a gateway provided in this embodiment of this application, the terminal 10 to access one of the plurality of UP devices 302. The UP device 302 is separately connected to the CP device 301 and the access network device 20. After determining, for the terminal 10 by using the method for accessing a gateway provided in this embodiment of this application, the UP device 302 to access the terminal 10, the CP device 301 may send user entry information to the determined UP device 302. Correspondingly, the UP device 302 may receive the user entry information sent by the CP device 301, and after receiving the data packet that is sent by the terminal 10 and that is forwarded by the access network device 20, forward the data packet sent by the terminal 10 based on the received user entry information.

The AAA server 40 may communicate with the CP device 301 included in the vBNG 30. The AAA server may receive user information that is of the terminal 10 and that is sent by the CP device 301, and perform authentication, authorization, and accounting on the terminal 10 based on the user information. In addition, in this embodiment of this application, the AAA server 40 may further determine, based on the user information, an SLA corresponding to the terminal 10, and feed back the SLA to the CP device 301, so that the CP device 301 selects a corresponding UP device 302 for the terminal 10 based on the SLA, and the terminal 10 may access the corresponding UP device 302.

The SDN controller 50 may communicate with the CP device 301 included in the vBNG 30. After selecting the corresponding UP device 302 for the terminal 10, the CP device 301 may deliver information about the terminal 10 and information about the selected UP device 302 to the SDN controller, so that the SDN controller may control the terminal 10 to access the corresponding UP device 302.

It should be noted that in this embodiment of this application, the CP device 301 may run on a server as a virtual network function (VNF) unit. The UP 302 may run on a server as a VNF unit, or may be a conventional physical network function (PNF) device.

Figure 2:
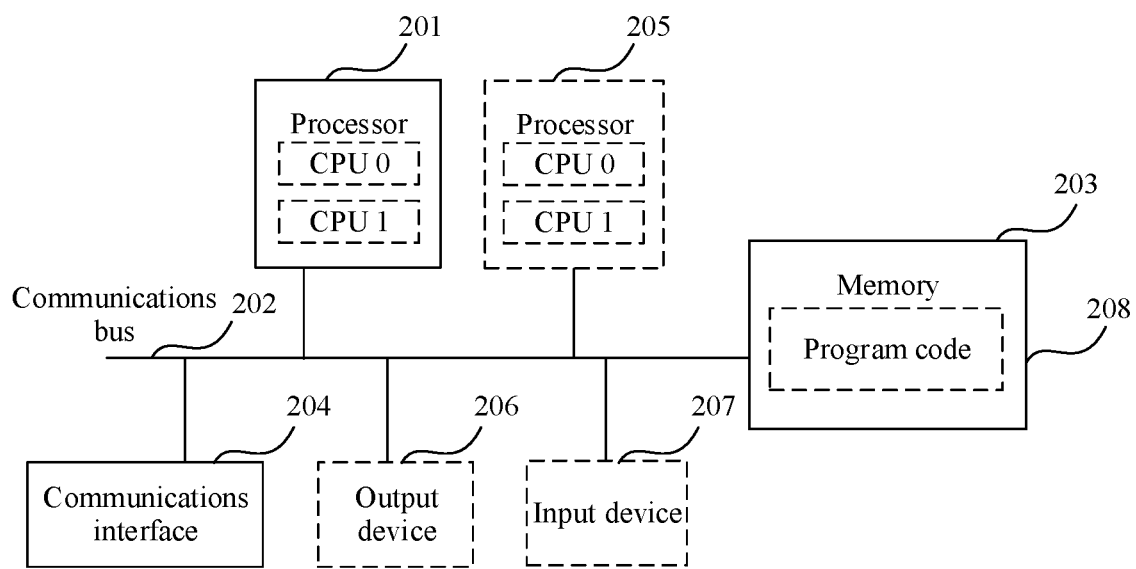
FIG. 2 is a schematic structural diagram of a network device according to an embodiment of this application.

FIG. 2 is a schematic structural diagram of a network device according to an embodiment of the disclosure. The vBNG and the SDN controller in FIG. 1 may be implemented by using the network device shown in FIG. 2. Referring to FIG. 2, the network device includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits configured to control program execution in the solutions of this application.

The communications bus 202 may include a channel for transmitting information between the foregoing components.

The memory 203 may be a read-only memory (ROM) or another type of static storage device capable of storing static information and an instruction, or a random access memory (RAM) or another type of dynamic storage device capable of storing information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer. However, the memory 203 is not limited thereto. The memory 203 may exist independently, and be connected to the processor 201 by using the communications bus 202. Alternatively, the memory 203 may be integrated into the processor 201.

The communications interface 204 may be any apparatus like a transceiver, and is configured to communicate with another device or communications network, such as Ethernet, a radio access network (RAN), or a wireless local area network (WLAN).

During specific implementations, in an embodiment, the processor 201 may include one or more CPUs, for example, a CPU 0 and a CPU 1 shown in FIG. 2.

During specific implementations, in an embodiment, the network device may include a plurality of processors, for example, the processor 201 and a processor 205 shown in FIG. 2. Each of the processors may be a single-core processor, or may be a multi-core processor. Herein the processor may be one or more devices, circuits, and/or processing cores configured to process data (for example, a computer program instruction).

During specific implementations, in an embodiment, the network device may further include an output device 206 and an input device 207. The output device 206 communicates with the processor 201, and may display information in a plurality of manners. For example, the output device 206 may be a liquid crystal display (LCD), a light emitting diode (LED) display device, a cathode ray tube (CRT) display device, or a projector. The input device 207 communicates with the processor 201, and may receive an input from a user in a plurality of manners. For example, the input device 207 may be a mouse, a keyboard, a touchscreen device, or a sensing device.

The network device may be a general-purpose computer device or a special-purpose computer device. During specific implementations, the network device may be a desktop computer, a network server, a wireless terminal device, a communications device, or an embedded device. A type of the network device is not limited in this embodiment of the disclosure.

When the network device is configured to implement the vBNG shown in FIG. 1, the memory 203 is configured to store program code for performing operations 301 to 306 in the following method embodiment. When the network device is configured to implement the SDN controller shown in FIG. 1, the memory 203 is configured to store program code for performing step 307 in the following method embodiment. The processor 201 is configured to execute program code 208 stored in the memory 203. The program code 208 may include one or more software modules. The vBNG or the SDN control shown in FIG. 1 may control, by using the processor 201 and the one or more software modules in the program code 208 in the memory 203, a terminal to access the UP device included in the vBNG.

The following describes a method for accessing a gateway provided in an embodiment of this application.

Figure 3:
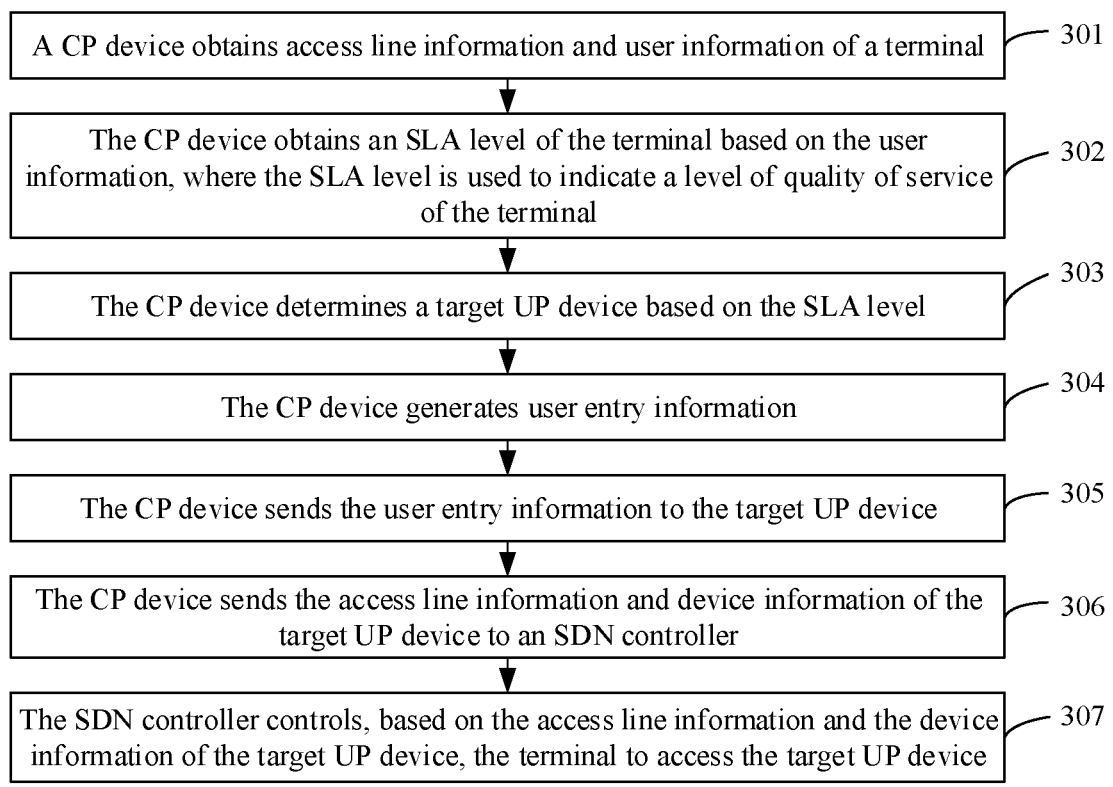
FIG. 3 is a flowchart of a method for accessing a gateway according to an embodiment of this application.

FIG. 3 shows a method for accessing a gateway according to an embodiment of this application. The method may be applied to the system shown in FIG. 1. As shown in FIG. 3, the method includes the following operations.

Step 301: A CP device obtains access line information and user information of a terminal.

In this embodiment of this application, when the terminal goes online, the terminal may dial up by using an access network device, to interact with the CP device. Correspondingly, the CP device may obtain the access line information of the terminal and the user information of the terminal in a process of interacting with the terminal.

Figure 4:
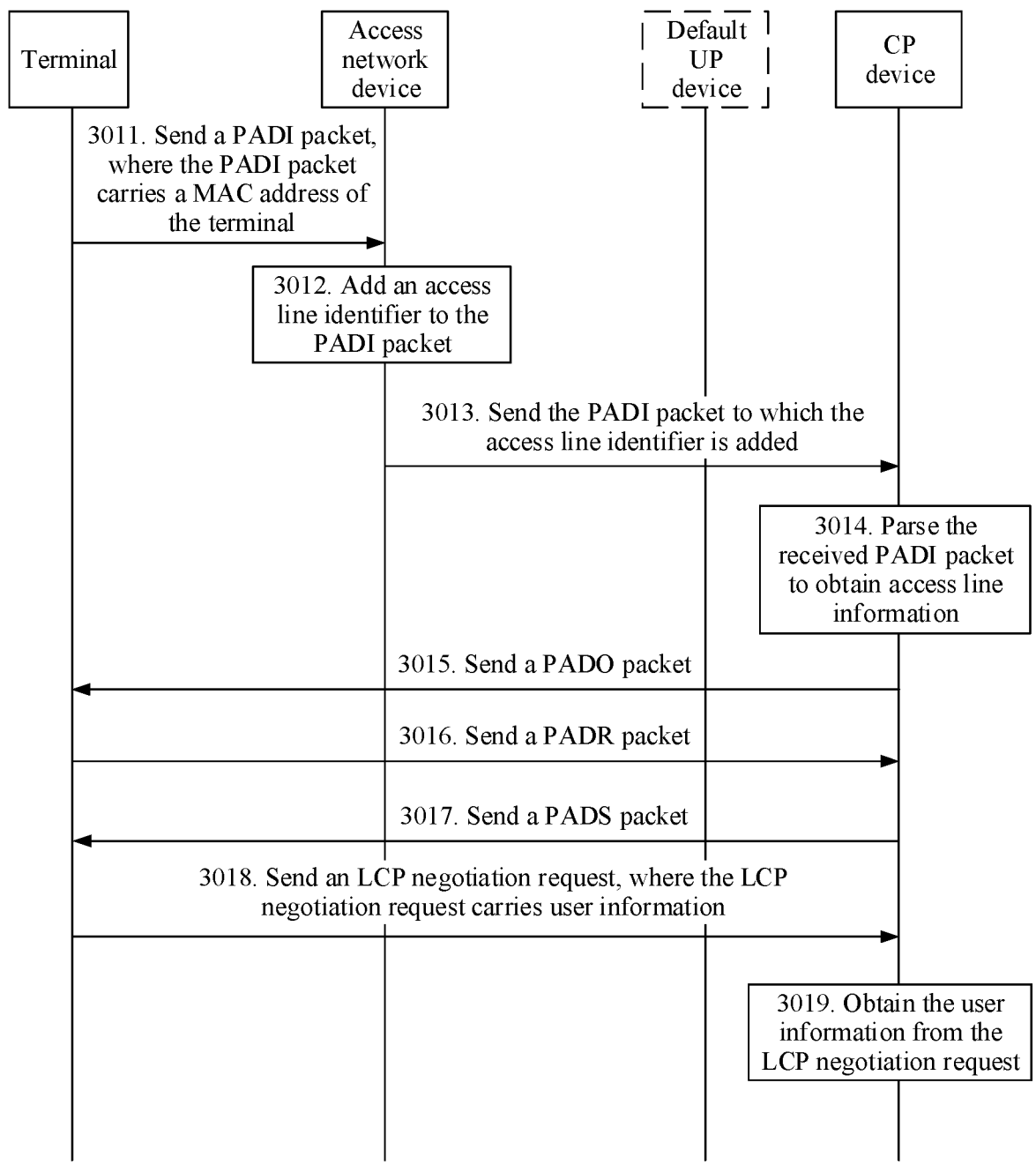
FIG. 4 is a flowchart of a method for obtaining user information and access line information of a terminal according to an embodiment of this application.

The following uses PPPoE dialup as an example to describe an implementation process in which the CP device obtains the access line information and the user information of the terminal. As shown in FIG. 4, the process includes the following operations.

3011: The terminal sends a PPPoE active discovery initiation (PADI) packet, where the PADI packet carries a media access control (MAC) address of the terminal.

The access line information includes the MAC address of the terminal.

3012: The access network device receives the PADI packet, and adds an access line identifier to the PADI packet.

After receiving the PADI packet, the access network device may add, to the PADI packet, the identifier used to indicate an access line that is used when the terminal accesses a network. Specifically, the access network device may add a tag field to the PADI packet, and the access line identifier is carried by using the tag field.

For example, the access network device includes an OLT. The OLT may add, as the access line identifier to the tag field, a device identifier of the OLT, port information of a port connected to the terminal, and an identifier of an optical network unit (ONU) to which the OLT belongs, and add the tag field to the PADI packet. In this case, the MAC address of the terminal, the device identifier of the OLT, the port information of the port that is on the OLT and that is connected to the terminal, and the identifier of the ONU to which the OLT belongs that are carried in the PADI packet are the access line information. Certainly, in addition to the foregoing information, the access line identifier may further include other information.

A format of the access line identifier carried in the tag field of the PADI packet may be: OLTID/ANI_frame/ANI_slot/ANI_subslot/ANI_port/ONU_ID. OLTID is the device identifier of the OLT, ANI_frame is a frame of the OLT, ANI_slot is a slot of the OLT, ANI_subslot is a subslot of the OLT, ANI_port is a port that is on the OLT and that is connected to the terminal, and ONU_ID is the identifier of the ONU to which the OLT belongs.

3013: The access network device sends, to the CP device, the PADI packet to which the access line identifier is added.

After adding the access line identifier to the PADI packet, the access network device may directly send the PADI packet to the CP device. In other words, the access network device may directly communicate with the CP device. Alternatively, in another possible implementation, the access network device may send the PADI packet to the CP device by using a default UP device. In this case, the access network device communicates with the CP device by using the default UP device. Specifically, the access network device may send the PADI packet to the default UP device, and the default UP device may forward the PADI packet to the CP device.

It should be noted that when the PADI packet is sent to the CP device by using the default UP device, after receiving the PADI packet, the default UP device may transmit the PADI packet to the CP device by using a service interface (Is) between the default UP device and the CP device.

In addition, it should be noted that, if a layer-2 network is applied between the access network device and the default UP device, the access network device may directly transmit the PADI packet to the default UP device through a virtual local area network (VLAN).

In an embodiment of the disclosure, if a layer-3 network is applied between the access network device and the default UP device, a virtual extensible local area network (VXLAN) tunnel may be established between the access network device and the default UP device. In this way, the access network device may encapsulate the PADI packet into a VXLAN packet, and then send the packet to the default UP device through the VXLAN tunnel.

3014: The CP device receives the PADI packet, and parses the PADI packet to obtain the access line information.

After receiving the PADI packet, the CP device may parse the PADI packet to extract the access line information from the PADI packet.

3015: The CP device sends a PPPoE active discovery offer (PADO) packet to the terminal by using the access network device.

After obtaining the access line information, the CP device may send the PADO packet to the access network device. After receiving the PADO packet, the access network device may forward the PADO packet to the terminal. The PADO packet carries information such as a MAC address of the CP device and an identifier of the CP device, and the PADO packet is used to notify the terminal that the terminal is allowed to establish a connection to the CP device.

3016: The terminal receives the PADO packet, and sends a PPPoE active discovery request (PADR) packet to the CP device by using the access network device.

After receiving the PADO packet, the terminal may return the PADR packet to the CP device by using the access network device. The PADR packet is used to notify the CP device that the terminal confirms acceptance of a connection provided by the CP device.

3017: The CP device receives the PADR packet, and sends a PPPoE active discovery session-confirmation (PADS) packet to the terminal by using the access network device.

The PADS packet carries a session identifier. Negotiation in PPPoE discovery phase between the CP device and the terminal is completed.

After the negotiation in the discovery phase is completed, a session negotiation phase starts.

3018: The terminal receives the PADS packet, and sends a link control protocol (LCP) negotiation request to the CP device by using the access network device, where the LCP negotiation request carries the user information.

The user information may include a user name and a password of the terminal.

In this operation, the terminal may send the LCP negotiation request to the access network device. After receiving the LCP negotiation request, if a communication connection is directly established between the access network device and the CP device, the access network device may directly send the LCP negotiation request to the CP device. If the access network device communicates with the CP device by using the default UP device, the access network device may send the LCP negotiation request to the default UP device. After receiving the LCP negotiation request, the default UP device may send the LCP negotiation request to the CP device through an Is service channel.

3019: The CP device receives the LCP negotiation request, and obtains the user information from the LCP negotiation request.

Because the LCP negotiation request carries the user information, after receiving the LCP negotiation request, the CP device may extract the user information from the LCP negotiation request.

The CP device obtains the access line information and the user information of the terminal to be accessed. Then, the CP device may obtain an SLA level of the terminal by using operation 302.

It should be noted that the foregoing describes only a process in which the CP device obtains the user information and the access line information of the terminal by using the PPPoE dialup as an example. Certainly, if IPoE dialup is used, the CP device may obtain the user information and the access line information in a process of interacting with the terminal during the IPoE dialup. Details are not described in this embodiment of this application.

Step 302: The CP device obtains the SLA level of the terminal based on the user information, where the SLA level is used to indicate a level of quality of service of the terminal.

After obtaining the user information, the CP device may initiate authentication to an AAA server. For example, the CP device may add the user information to an authentication request, and send the authentication request to the AAA server. After receiving the authentication request, the AAA server may authenticate the terminal according to the authentication request. If authentication succeeds, the AAA server may obtain, based on the user information from a stored correspondence between user information and an SLA level, an SLA level corresponding to the user information of the terminal; add the obtained SLA level to a successful authentication message; and send the successful authentication message to the CP device. The successful authentication message may further carry other authorization information of the terminal, for example, quality of service (QoS) and an access control list (ACL) of the terminal.

In an embodiment of the disclosure, in a possible implementation, the CP device may store the correspondence between user information and an SLA level. In this case, after the AAA server successfully authenticates the terminal based on the user information, the AAA server may directly send the successful authentication message to the CP device. In this case, the successful authentication message may not carry the SLA level of the terminal. Correspondingly, after receiving the successful authentication message, the CP device may obtain, from the correspondence between the user information and the SLA level that is stored in the CP device, the SLA level corresponding to the user information of the terminal, and use the obtained SLA level as the SLA level of the terminal.

It should be noted that, after obtaining the SLA level of the terminal, the CP device may send accounting start message to the AAA server, to instruct the AAA server to start to perform accounting on the terminal. In addition, the CP device may allocate an IP address and corresponding domain name system (DNS) information to the terminal by using a PPPoE network control protocol (NCP).

Step 303: The CP device determines a target UP device based on the SLA level.

After obtaining the SLA level, the CP device may obtain, from a stored correspondence between the SLA level and a device identifier, a device identifier corresponding to the SLA level of the terminal, and use a device identified by the obtained device identifier as the target UP device.

It should be noted that the correspondence between the SLA level and a device identifier is preconfigured, and different SLA levels correspond to different device identifiers. In other words, in this embodiment of this application, different UP devices may be used to provide services for users at different SLA levels. For example, if an SLA level is A, a corresponding device identifier is ID 1. If an SLA level is B, a corresponding device identifier is ID 3. In this way, different SLA levels correspond to different UP devices.

Step 304: The CP device generates user entry information.

After determining the target UP device, the CP device may generate routing information of the terminal. Then, an IP address allocated to the terminal, the MAC address of the terminal, the routing information of the terminal and the authorization information such as the QoS and the ACL of the terminal are used as the user entry information.

Step 305: The CP sends the user entry information to the target UP device.

The CP may deliver the generated user entry information to the target UP device by using a control interface (Ic) between the CP and the target UP device.

The target UP device may generate a user forwarding entry based on the user entry information, generate a user route at the same time, and advertise the user route to another related device. Therefore, when subsequently receiving a data packet sent by the terminal, the target UP device may forward the data packet based on the user forwarding entry and the user route.

Step 306: The CP device sends the access line information and device information of the target UP device to an SDN controller.

After determining the target UP device, the CP device may further deliver the device information of the target UP device and the access line information of the terminal to the SDN controller. When the layer-2 network is applied between the access network device and the target UP device an access network and a UP device, the device information of the target UP device may include VLAN information corresponding to a target port on the target UP device. The target port is a port allocated to the terminal. When the layer-3 network is applied between the access network and the target UP device, the device information of the target UP device may include a network identifier of a virtual extensible local area network VXLAN corresponding to the target UP device. Certainly, considering that the SDN controller maintains network topology information, to help the SDN controller update the network topology information in a timely manner, the device information of the target UP device may further include other information such as a device identifier of the target UP device and port information of the target port, so that the SDN controller stores the information.

It should be noted that in this embodiment of this application, the CP device may deliver the access line information and the device information of the target UP device to the SDN controller by using a restful interface.

For example, if the layer-2 network is applied between the access network and the target UP device, an information model transferred by the restful interface may be OLTID/ANI_frame/ANI_slot/ANI_subslot/ANI_port/ONU_ID, and NAS_UpIdentifier/NAS_slot/NAS_subslot/NAS_port: SVLAN. CVLAN. It can be learned from the description in operation 3012 that, OLTID/ANI_frame/ANI_slot/ANI_subslot/ANI_port/ONU_ID is the access line information. NAS_UpIdentifier is the device identifier of the target UP device, NAS_slot is a slot of the target UP device, NAS_subslot is a subslot of the target UP device, NAS_port is the target port that is in a target UP device and that is allocated to the terminal, and SVLAN. CVLAN is a VLAN corresponding to the target port.

It should be noted that there is no sequence between this operation and operation 304. In other words, the CP device may first perform operation 304 and then perform operation 306, or may first perform operation 306 and then perform operation 304, or the CP device may simultaneously perform operation 304 and operation 306. This is not limited in this embodiment of this application.

Step 307: The SDN controller controls, based on the access line information and the device information of the target UP device, the terminal to access the target UP device.

In this embodiment of this application, this operation may be implemented in different manners based on different networks applied between the access network device and the target UP device.

When the layer-2 network is applied between the access network device and the target UP device, after receiving the access line information and the device information of the target UP device, the SDN controller may determine, based on the access line information, VLAN information corresponding to the terminal, and send a migration instruction to the OLT based on the device identifier of the OLT. The migration instruction carries the port information of the port that is on the OLT and that is connected to the terminal, the VLAN information corresponding to the terminal, and the VLAN information corresponding to the target port on the target UP device. In addition, the migration instruction is used to instruct the OLT to access, based on the port information of the port that is on the OLT and that is connected to the terminal, the VLAN information corresponding to the terminal, and the VLAN information corresponding to the target port on the target UP device, the terminal to the target UP device.

It should be noted that the SDN controller stores the network topology information. In this way, the SDN controller may determine, based on the device identifier of the OLT and the identifier of the ONU that are in the access line information, the VLAN information corresponding to the terminal. The VLAN information corresponding to the terminal is information about a VLAN corresponding to the terminal when the terminal dials up. In other words, the VLAN information corresponding to the terminal is actually information about a VLAN corresponding to the default UP device.

After determining the VLAN information corresponding to the terminal, the SDN controller may obtain, from the received device information of the target UP device, the VLAN information corresponding to the target port of the target UP device.

After determining second VLAN information corresponding to the terminal, the SDN controller may directly establish a mapping relationship between the port information of the port that is on the OLT and that is connected to the terminal, the VLAN information corresponding to the terminal, the device identifier of the target UP device, the port information of the target port of the target UP device, and the VLAN information corresponding to the target port.

After obtaining the VLAN information corresponding to the target port, the SDN controller may deliver, by using a netconf interface based on the stored network topology information and the device identifier of the OLT in the access line information, the migration instruction to the OLT that is identified by the device identifier of the OLT. The migration instruction may carry the obtained port information of the port that is on the OLT and that is connected to the terminal, the VLAN information corresponding to the terminal, and the VLAN information corresponding to the target port.

After receiving the migration instruction, the OLT may search the stored mapping relationship between port information and VLAN information for a record that includes the port information and the VLAN information corresponding to the terminal that are carried in the migration instruction. Then, the OLT may update VLAN information corresponding to the port information in the found record to the VLAN information corresponding to the target port. In this way, the OLT remaps a VLAN connected to the terminal when the terminal dials up to a new VLAN. When subsequently receiving the data packet sent by the terminal, the OLT may forward the data packet sent by the terminal to a corresponding target UP device based on the mapping relationship. Further, the target UP device forwards the data packet sent by the terminal based on the generated user forwarding entry and the user route of the terminal.

In this embodiment of this application, the VLAN corresponding to the terminal when the terminal dials up is remapped to the new VLAN. In this way, even if a MAC address of the target UP device is the same as a MAC address of the default UP device when the terminal dials up, it can also be ensured that the terminal subsequently accesses the target UP device instead of the default UP device.

Figure 5:
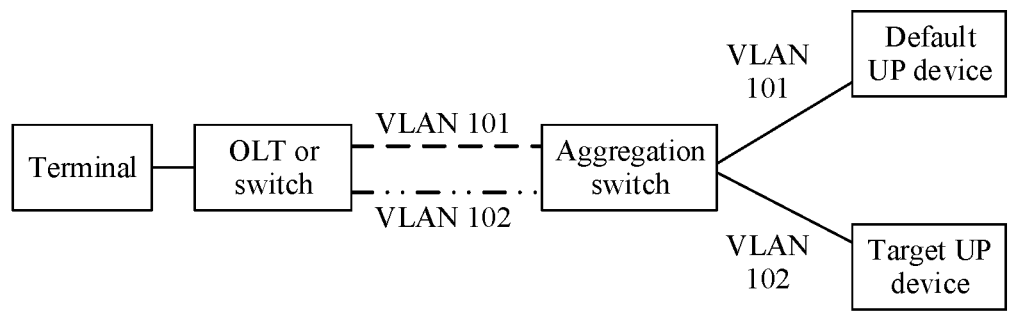
FIG. 5 is a schematic diagram of controlling a terminal to access a target UP device according to an embodiment of this application.

FIG. 5 is a schematic diagram of controlling a terminal to access a target UP device according to an embodiment of this application. As shown in FIG. 5, a VLAN corresponding to a terminal when the terminal dials up is a VLAN 101, and the VLAN 101 corresponds to a default UP device. During dialup, an OLT or a switch maps the terminal to the VLAN 101. Therefore, a dialup protocol packet is forwarded to the default UP device. After determining the target UP device, an SDN controller delivers, to the OLT or the switch, a migration instruction that carries VLAN information corresponding to a target port of the target UP device. After receiving the migration instruction, the OLT or the switch remaps the terminal to a VLAN 102 indicated by the VLAN information corresponding to the target port. Because the VLAN 102 corresponds to the target port of the target UP device, after subsequently receiving a data packet sent by the terminal, the OLT or the switch may forward the data packet to the target UP device by using the VLAN 102 obtained after remapping.

In an embodiment of the disclosure, when a layer-3 network is applied between an access network device and the target UP device, the SDN controller may determine, based on access line information, VLAN information corresponding to the terminal, and send a migration instruction to the OLT based on a device identifier of the OLT. The migration instruction carries port information of a port that is on the OLT and that is connected to the terminal, the VLAN information corresponding to the terminal, and a network identifier of a VXLAN corresponding to the target UP device. In addition, the migration instruction is used to instruct the OLT to access, based on the port information of the port that is on the OLT and that is connected to the terminal, the VLAN information corresponding to the terminal, and the network identifier of the VXLAN corresponding to the target UP device, the terminal to the target UP device.

When the layer-3 network is applied between the access network device and the target UP device, a VXLAN tunnel may be established between the access network device and the target UP device. In this case, after determining the VLAN information corresponding to the terminal, the SDN controller may add, to the migration instruction, the port information of the port that is on the OLT and that is connected to the terminal, the VLAN information corresponding to the terminal, and the network identifier of the VXLAN corresponding to the target UP device, and deliver the migration instruction to the OLT.

It should be noted that, when the terminal dials up, the port that is on the OLT and that is connected to the terminal and a VLAN corresponding to the terminal are mapped to a VXLAN corresponding to the default UP device. In other words, the OLT stores a mapping relationship between the port information of the port that is on the OLT and that is connected to the terminal, the VLAN information corresponding to the terminal, and a network identifier of a VXLAN corresponding to the default UP device. In this case, after receiving device information of the target UP device, to control the terminal to access the target UP device, the SDN controller needs to map an access port and the VLAN of the terminal to the VXLAN corresponding to the target UP device. Based on this, the SDN controller may deliver, to the OLT, the VXLAN corresponding to the target UP device.

After receiving the migration instruction delivered by the SDN controller, the OLT may search, based on the port information of the port connected to the terminal and the VLAN information corresponding to the terminal that are carried in the migration instruction, the stored mapping relationship for a record that includes the port information and the VLAN information. Then, the OLT updates a network identifier of a VXLAN corresponding to the port information and the VLAN information in the found record to the network identifier of the VXLAN corresponding to the target UP device.

Figure 6:
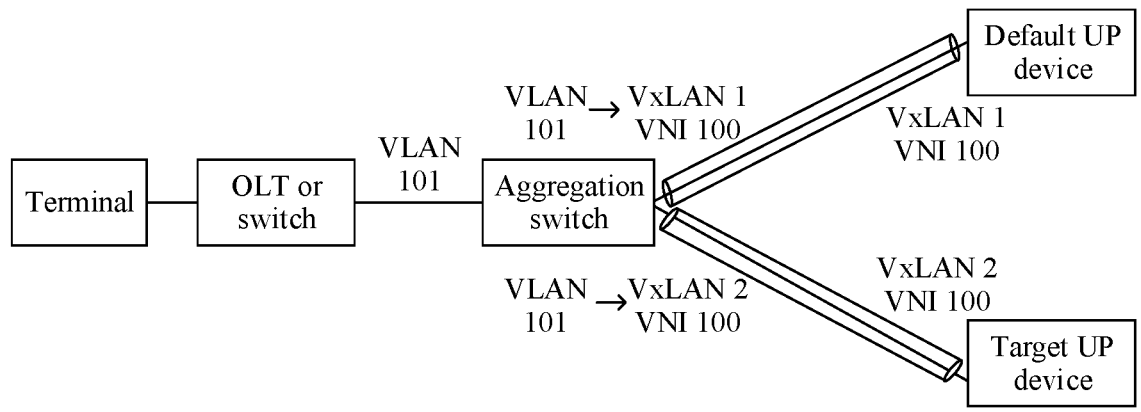
FIG. 6 is another schematic diagram of controlling a terminal to access a target UP device according to an embodiment of this application.

FIG. 6 is another schematic diagram of controlling a terminal to access a target UP device according to an embodiment of this application. As shown in FIG. 6, a terminal accesses a VLAN 101 when the terminal dials up. An access port of the terminal and the corresponding VLAN 101 are mapped to a VXLAN 1 VNI 100 that is connected to a default UP device. After determining the target UP device, an SDN controller adds, to a migration instruction, a network identifier of a VXLAN corresponding to the target UP device, and delivers the migration instruction to an OLT or a switch. After receiving the migration instruction, the OLT or the switch remaps the access port of the terminal and the VLAN 101 corresponding to the terminal to a VXLAN 2 VNI 100 corresponding to the target UP device. Because the VXLAN 2 VNI 100 corresponds to the target UP device, after subsequently receiving a data packet sent by the terminal, the OLT or the switch may forward the data packet to the target UP device by using a VXLAN obtained after remapping.

In this embodiment of this application, a CP device may obtain an SLA level based on user information of the terminal, and then determine, based on the SLA level of the terminal, a target UP device corresponding to the terminal, to control the terminal to access the corresponding target UP device. Because the corresponding target UP device may be determined based on the SLA level of the terminal, terminals with different SLA levels may access different UP devices. In other words, a specific terminal may access a specified UP device. This resolves a problem in a related technology that a terminal relatively randomly accesses a UP device. In addition, because an SLA level may be used to indicate a level that is of quality of service and that corresponds to a terminal, after terminals with different SLA levels access different UP devices, differentiated services may be provided on the different UP devices. Therefore, user requirements are met, and revenues are increased.

Figure 7:
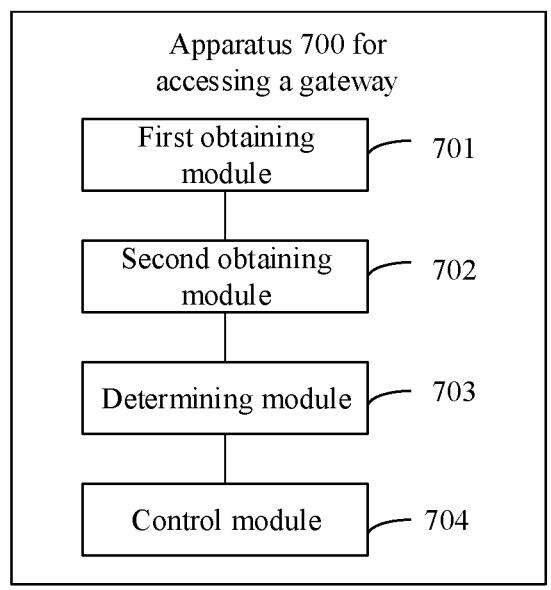
FIG. 7 is a schematic structural diagram of an apparatus for accessing a gateway according to an embodiment of this application.

Referring to FIG. 7, an embodiment of this application provides an apparatus 700 for accessing a gateway. The apparatus 700 includes a first obtaining module 701, a second obtaining module 702, a determining module 703, and a control module 704.

The first obtaining module 701 is configured to obtain access line information and user information of a terminal. For specific implementations of this function, refer to operation 301 in the embodiment shown in FIG. 3 and an implementation process of the CP in the embodiment shown in FIG. 4.

The second obtaining module 702 is configured to obtain a service level agreement SLA level of the terminal based on the user information, and the SLA level is used to indicate a level of quality of service of the terminal. For specific implementations of this function, refer to an implementation process of the CP in operation 302 in the embodiment shown in FIG. 3.

The determining module 703 is configured to determine a target user plane UP device based on the SLA level. For specific implementations of this function, refer to an implementation process of the CP in operation 303 in the embodiment shown in FIG. 3.

The control module 704 is configured to control, based on the access line information, the terminal to access the target UP device. For specific implementation of this function, refer to an implementation process of the CP in operation 306 in the embodiment shown in FIG. 3.

In an embodiment of the disclosure, device information of the target UP device includes a device identifier of the target UP device, port information of a target port of the target UP device allocated to the terminal, and virtual local area network VLAN information corresponding to the target port.

In an embodiment of the disclosure, the device information of the target UP device includes the device identifier of the target UP device and a network identifier of a virtual extensible local area network VXLAN corresponding to the target UP device.

In an embodiment of the disclosure, the apparatus 700 may further include a generation module and a sending module.

The generation module is configured to generate user entry information. For specific implementations of this function, refer to an implementation process of the CP in operation 304 in the embodiment shown in FIG. 3.

The sending module is configured to send the user entry information to the target UP device, to instruct the target UP device to forward, based on the user entry information, a data packet sent by the terminal after access succeeds. For specific implementations of this function, refer to an implementation process of the CP in operation 305 in the embodiment shown in FIG. 3.

In an embodiment of the disclosure, the user entry information includes an internet protocol IP address allocated to the terminal, a MAC address of the terminal, routing information of the terminal, and authorization information of the terminal.

In conclusion, in this embodiment of this application, the SLA level may be obtained based on the user information of the terminal, and then the target UP device corresponding to the terminal is determined based on the SLA level of the terminal, so that the terminal is controlled to access the corresponding target UP device. Because a corresponding target UP device may be determined based on an SLA level of a terminal, terminals with different SLA levels may access different UP devices. In other words, a specific terminal may access a specified UP device. This resolves a problem in a related technology that a terminal relatively randomly accesses a UP device. In addition, because an SLA level may be used to indicate a level that is of quality of service and that corresponds to a terminal, after terminals with different SLA levels access different UP devices, differentiated services may be provided on the different UP devices. Therefore, user requirements are met, and revenues are increased.

Figure 8:
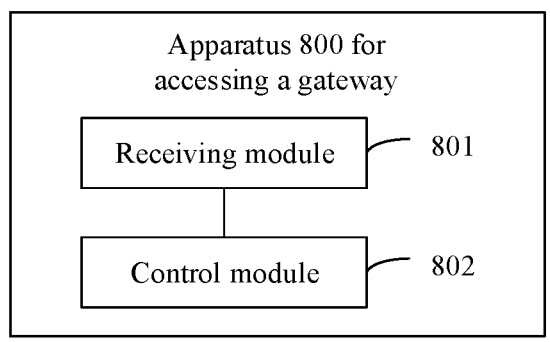
FIG. 8 is a schematic structural diagram of another apparatus for accessing a gateway according to an embodiment of this application.

Referring to FIG. 8, an embodiment of this application provides an apparatus 800 for accessing a gateway. The apparatus 800 includes:

a receiving module 801, configured to receive access line information of a terminal and device information of a target UP device that are sent by a CP device, where the target UP device corresponds to an SLA level of the terminal; and a control module 802, configured to control, based on the access line information and the device information of the target UP device, the terminal to access the target UP device. For specific implementations of this function, refer to an implementation process of the SDN controller in operation 307 in the embodiment shown in FIG. 3.

In an embodiment of the disclosure, the terminal is connected to an access network device, and the access network device includes an OLT. The access line information includes a device identifier of the OLT, port information of a port that is on the OLT and that is connected to the terminal, and an identifier of an optical network unit ONU to which the OLT belongs. The device information of the target UP device includes virtual local area network VLAN information corresponding to a target port on the target UP device, and the target port is a port allocated to the terminal.

In an embodiment of the disclosure, the terminal is connected to an access network device, and the access network device includes an optical line terminal OLT. The access line information includes a device identifier of the OLT, port information of a port that is on the OLT and that is connected to the terminal, and an identifier of the optical network unit ONU to which the OLT belongs. The device information of the target UP device includes a network identifier of a virtual extensible local area network VXLAN corresponding to the target UP device.

In this embodiment of this application, after receiving the access line information of the terminal and the device information of the target UP device that are sent by the CP device, the SDN controller may control, based on the access line information and the device information of the target UP device, the terminal to access the target UP device. The target UP device corresponds to the SLA level of the terminal. In other words, the terminal may access a specified UP device in this application. Therefore, this resolves a problem in a related technology that a terminal relatively randomly accesses a UP device.

It should be noted that when the apparatus for accessing a gateway according to the foregoing embodiment controls the terminal to access a gateway, division of the foregoing function modules is merely an example. In actual implementation, the foregoing functions may be allocated to different modules and implemented. In other words, inner structure of the apparatus is divided into different function modules to implement all or a part of the functions described above. In addition, the apparatus for accessing a gateway provided in the foregoing embodiment and the method for accessing a gateway in the method embodiment are based on same concepts. For a specific implementation process, refer to the method embodiments. Details are not described herein again.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to the embodiments of the disclosure are all or partially generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center wiredly (for example, a coaxial cable, an optical fiber, or a digital subscriber line (DSL)) or wirelessly (for example, infrared, radio, or microwave). The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the operations of the foregoing embodiments may be implemented by hardware or a program instructing related hardware. The program may be stored in a computer readable storage medium. The storage medium may be a read-only memory, a magnetic disk, an optical disc, or the like.

The foregoing descriptions are the embodiments provided in this application, but are not intended to limit this application. Any modification, equivalent replacement, or improvement made without departing from the spirit and principle of this application shall fall within the protection scope of this application.

What is claimed is:

1. A method for accessing a gateway, wherein the method comprises:
   obtaining access line information and user information of a terminal;
   obtaining a service level agreement (SLA) level of the terminal based on the user information, wherein the SLA level is to indicate a level of quality of service of the terminal;
   determining a target user plane (UP) device based on the SLA level and a device identifier corresponding to the SLA level; and
   controlling, based on the access line information, the terminal to access the target UP device.

2. The method according to claim 1, wherein the obtaining of the SLA level of the terminal based on the user information comprises:
   sending the user information to an authentication, authorization, and accounting (AAA) server, to instruct the AAA server to obtain the SLA level of the terminal; and
   receiving the SLA level that is of the terminal and that is sent by the AAA server.

3. The method according to claim 1, wherein the obtaining of the SLA level of the terminal based on the user information comprises:
   obtaining the SLA level of the terminal based a stored correspondence between the user information and the SLA level.

4. The method according to claim 1, wherein the determining of the target UP device based on the SLA level comprises:
obtaining the device identifier corresponding to the SLA level of the terminal based on a stored correspondence between the SLA level and the device identifier; and
determining a device identified by the obtained device identifier as the target UP device.

5. The method according to claim 1, wherein the controlling of the terminal to access the target UP device comprises:
sending the access line information and device information of the target UP device to a software-defined networking (SDN) controller, to instruct the SDN controller to control the terminal to access the target UP device.

6. The method according to claim 5, wherein the device information of the target UP device comprises the device identifier of the target UP device, port information of a target port of the target UP device allocated to the terminal, and virtual local area network VLAN information corresponding to the target port.

7. The method according to claim 5, wherein the device information of the target UP device comprises the device identifier of the target UP device and a network identifier of a virtual extensible local area network (VXLAN) corresponding to the target UP device.

8. The method according to claim 1, wherein after the determining of the target UP device based on the SLA level, the method further comprises:
generating user entry information; and
sending the user entry information to the target UP device, to instruct the target UP device to forward, based on the user entry information, a data packet sent by the terminal after access succeeds.

9. The method according to claim 8, wherein the user entry information comprises an internet protocol (IP address allocated to the terminal, a media access control (MAC) address of the terminal, routing information of the terminal, and authorization information of the terminal.

10. The method according to claim 1, wherein the obtaining of the access line information and the user information of a terminal comprises:
receiving a dialup protocol packet sent by the terminal by using an access network device, wherein the dialup protocol packet carries the access line information; and
receiving a link control protocol (LCP) negotiation request sent by the terminal by using the access network device, wherein the LCP negotiation request carries the user information.

11. The method according to claim 10, wherein the access network device comprises an optical line terminal (OLT); and
wherein the access line information comprises a media access control (MAC) address of the terminal, a device identifier of the OLT, port information of a port that is on the OLT and that is connected to the terminal, and an identifier of an optical network unit ONU to which the OLT belongs.

12. The method according to claim 1, wherein the target UP device is in a virtual broadband network gateway (vBNG), the vBNG further comprises a control plane (CP) device.

13. A method for accessing a gateway, wherein the method comprises:
receiving access line information of a terminal and device information of a target user plane (UP) device that are sent by a control plane (CP) device, wherein the target UP device corresponds to a service level agreement (SLA) level of the terminal and a device identifier corresponding to the SLA level; and
controlling, based on the access line information and the device information of the target UP device, the terminal to access the target UP device.

14. The method according to claim 13, wherein the terminal is connected to an access network device, and the access network device comprises an optical line terminal (OLT);
wherein the access line information comprises a device identifier of the OLT, port information of a port on the OLT and connected to the terminal, and an identifier of an optical network unit (ONU) to which the OLT belongs; and
wherein the device information of the target UP device comprises virtual local area network (VLAN) information corresponding to a target port on the target UP device, and wherein the target port is a port allocated to the terminal.

15. The method according to claim 14, wherein the controlling of the terminal to access the target UP device comprises:
determining, based on the access line information, VLAN information corresponding to the terminal; and
sending a migration instruction to the OLT based on the device identifier of the OLT, wherein the migration instruction carries the port information of the port that is on the OLT and that is connected to the terminal, the VLAN information corresponding to the terminal, and the VLAN information corresponding to the target port, and wherein the migration instruction is to instruct the OLT to access the terminal to the target UP device based on the port information of the port that is on the OLT and that is connected to the terminal, the VLAN information corresponding to the terminal, and the VLAN information corresponding to the target port.

16. The method according to claim 13, wherein the terminal is connected to an access network device, and wherein the access network device comprises an optical line terminal (OLT);
wherein the access line information comprises a device identifier of the OLT, port information of a port that is on the OLT and that is connected to the terminal, and an identifier of an optical network unit (ONU) to which the OLT belongs; and
wherein the device information of the target UP device comprises a network identifier of a virtual extensible local area network (VXLAN) corresponding to the target UP device.

17. An apparatus for accessing a gateway, wherein the apparatus comprises:
one or more processors; and
a memory configured to store one or more computer programs, wherein the one or more computer programs comprise instructions which are executed by the one or more processors to cause the apparatus to:
obtain access line information and user information of a terminal;
obtain a service level agreement (SLA) level of the terminal based on the user information, wherein the SLA level is to indicate a level of quality of service of the terminal;
determine a target user plane (UP) device based on the SLA level and a device identifier corresponding to the SLA level; and control, based on the access line information, the terminal to access the target UP device.

18. The apparatus according to claim 17, wherein the apparatus is further caused to:
send the user information to an authentication, authorization, and accounting (AAA) server, to instruct the AAA server to obtain the SLA level of the terminal; and
receive the SLA level that is of the terminal and that is sent by the AAA server.

19. The apparatus according to claim 17, wherein the apparatus is further caused to:
obtain the SLA level of the terminal based on a stored correspondence between the user information and the SLA level.

20. The apparatus according to claim 17, wherein the apparatus is further caused to:
obtain the device identifier corresponding to the SLA level of the terminal based on a stored correspondence between the SLA level and the device identifier; and
determine a device identified by the obtained device identifier as the target UP device.

21. The apparatus according to claim 17, wherein the apparatus is further caused to:
send the access line information and device information of the target UP device to a software-defined networking (SDN) controller, to instruct the SDN controller to control the terminal to access the target UP device.

22. The apparatus according to claim 21, wherein the device information of the target UP device comprises the device identifier of the target UP device, port information of a target port of the target UP device allocated to the terminal, and virtual local area network (VLAN) information corresponding to the target port.

23. The apparatus according to claim 21, wherein the device information of the target UP device comprises the device identifier of the target UP device and a network identifier of a virtual extensible local area network VXLAN corresponding to the target UP device.

24. The apparatus according to claim 17, wherein the apparatus is further caused to:
generate user entry information; and
send the user entry information to the target UP device, to instruct the target UP device to forward, based on the user entry information, a data packet sent by the terminal after access succeeds.

25. The apparatus according to claim 24, wherein the user entry information comprises an internet protocol IP address allocated to the terminal, a media access control (MAC) address of the terminal, routing information of the terminal, and authorization information of the terminal.

26. The apparatus according to claim 17, wherein the apparatus is further caused to:
receive a dialup protocol packet sent by the terminal by using an access network device, wherein the dialup protocol packet carries the access line information; and
receive a link control protocol (LCP) negotiation request sent by the terminal by using the access network device, wherein the LCP negotiation request carries the user information.

27. The apparatus according to claim 26, wherein the access network device comprises an optical line terminal OLT; and
wherein the access line information comprises the media access control MAC address of the terminal, a device identifier of the OLT, port information of a port that is on the OLT and that is connected to the terminal, and an identifier of an optical network unit ONU to which the OLT belongs.

28. The apparatus according to claim 17, wherein the target UP device is in a virtual broadband network gateway (vBNG), and the apparatus is a control plane (CP) device in the vBNG.

29. An apparatus for accessing a gateway, wherein the apparatus comprises:
one or more processors; and
a memory, configured to store one or more computer programs, wherein the one or more computer programs comprise instructions which are executed by the one or more processors to cause the apparatus to:
receive access line information of a terminal and device information of a target user plane (UP) device that are sent by a control plane (CP) device, wherein the target UP device corresponds to a service level agreement (SLA) level of the terminal and a device identifier corresponding to the SLA level; and
control, based on the access line information and the device information of the target UP device, the terminal to access the target UP device.

30. The apparatus according to claim 29, wherein the terminal is connected to an access network device, and wherein the access network device comprises an optical line terminal (OLT);
wherein the access line information comprises a device identifier of the OLT, port information of a port that is on the OLT and that is connected to the terminal, and an identifier of an optical network unit ONU to which the OLT belongs; and
wherein the device information of the target UP device comprises VLAN information corresponding to a target port on the target UP device, and wherein the target port is a port allocated to the terminal.

31. The apparatus according to claim 30, wherein the apparatus is further caused to:
determine, based on the access line information, VLAN information corresponding to the terminal; and
send a migration instruction to the OLT based on the device identifier of the OLT, wherein the migration instruction carries the port information of the port that is on the OLT and that is connected to the terminal, the VLAN information corresponding to the terminal, and the VLAN information corresponding to the target port, and wherein the migration instruction is to instruct the OLT to access the terminal to the target UP based on the port information of the port that is on the OLT and that is connected to the terminal, the VLAN information corresponding to the terminal, and the VLAN information corresponding to the target port device.

32. The apparatus according to claim 29, wherein the terminal is connected to an access network device, and wherein the access network device comprises an optical line terminal (OLT);
wherein the access line information comprises a device identifier of the OLT, port information of a port that is on the OLT and that is connected to the terminal, and an identifier of an optical network unit ONU to which the OLT belongs; and
wherein the device information of the target UP device comprises a network identifier of a virtual extensible local area network (VXLAN) corresponding to the target UP device.

\* \* \* \* \*